United States Patent [19]

Smith, Jr.

[11] 4,261,415
[45] Apr. 14, 1981

[54] METHOD AND APPARATUS FOR COOLING A PRESSURE VESSEL

[75] Inventor: Charles W. Smith, Jr., Fairview, Pa.

[73] Assignee: Autoclave Engineers, Inc., Erie, Pa.

[21] Appl. No.: 86,294

[22] Filed: Oct. 19, 1979

[51] Int. Cl.³ .......................... F28F 28/00; F28F 3/12
[52] U.S. Cl. ................................... 165/1; 165/13; 165/32; 165/47; 165/101; 220/3; 432/233; 165/169
[58] Field of Search ............... 165/47, 101, 107, 13, 165/169, 32, 1; 220/3; 432/233, 237, 238, 251; 73/15.6

[56] References Cited

U.S. PATENT DOCUMENTS 3,476,281  11/1969  Cornish et al. ........................ 220/3
3,653,434  4/1972  Andersson ........................ 165/169

Primary Examiner—Albert W. Davis
Assistant Examiner—Margaret A. Focarino
Attorney, Agent, or Firm—Webb, Burden, Robinson & Webb

[57] ABSTRACT

A pressure vessel comprising a cylindrical stress liner, a pair of end plates, a plurality of annular shrink rings positioned about the circumference of the stress liner, and a plurality of coolant-filled annular cooling coils positioned about the shrink rings is disclosed. Nonuniform stress producing bending stresses in the shrink rings are eliminated by the method comprising the steps for detecting a stress concentration in a shrink ring and causing coolant to be recirculated from a reservoir through the coil about the shrink ring.

11 Claims, 5 Drawing Figures

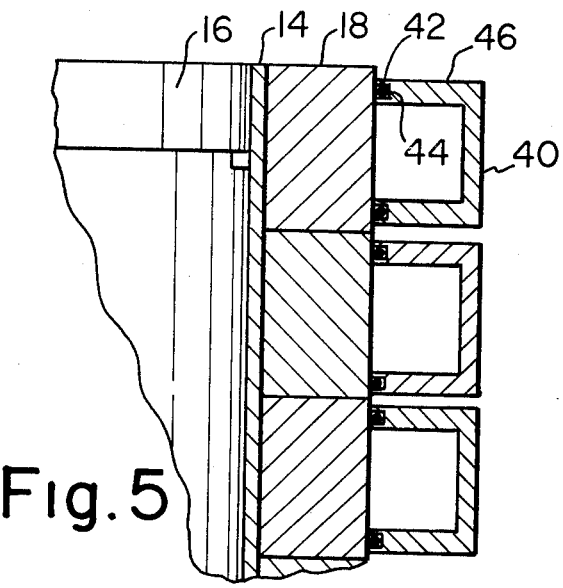

4,261,415

METHOD AND APPARATUS FOR COOLING A PRESSURE VESSEL

FIELD OF THE INVENTION

This invention relates to pressure vessels in general and in particular to cooled pressure vessels within reaction frames.

PRIOR ART

Pressure vessels having annular shrink rings to bear the radial forces transmitted by the stress liner are well-known in the art. Such vessel and ring combinations are used in combination with reaction frames which bear the axial forces transmitted by the cover plates. An example of such a combination is disclosed in U.S. Pat. No. 3,476,281.

Frequently, the contents of the pressure vessel become heated and the heat energy generated is conducted to the shrink rings causing them to expand. This situation would occur when the vessel contains a furnace used for hot isostatic pressing or when an exothermic reaction takes place within the vessel. The expansion of the shrink rings is usually uneven along the length of the vessel, a condition that produces nonuniform tangential stresses which give rise to bending stresses that shorten the fatigue life and lower the maximum safe operating temperature and pressure.

Therefore, it is desirable to cool the shrink rings so that they maintain a uniform and constant diameter. It would be possible to place a unitary cylindrical cooling jacket over the shrink rings and to circulate a coolant between the walls of the jacket, but this means of cooling has several disadvantages. A rigid cooling jacket which extends the length of the vessel would not be adapted to respond to specialized needs of the individual shrink rings. For example, if the temperature within the vessel is not uniform, the shrink rings adjacent the hotter areas will need a greater circulation or a colder coolant to maintain their shape than will those adjacent cooler areas.

It would be more difficult to detect leaks in the vessel walls if a unitary cooling jacket is used. At low pressures, material seeping through cracks in the vessel walls would flow between the shrink rings and either be retained by the cooling jacket or leak into the jacket to contaminate the coolant. At high pressures, the leakage would cause the unitary cooling jacket to be ripped off the shrink rings or to burst.

Another drawback of a unitary cooling jacket would be its inability to conform to the segmented shrink rings it encloses. If the stress rings expand unevenly, the walls of the jacket itself would become stressed and deformed creating pockets between the walls of the jacket and the outer surface of the shrink rings. These pockets would inhibit the flow of heat from the shrink rings to the cooling jacket.

A need exists for a means of cooling a pressure vessel so that the shrink rings adjacent hotter areas receive greater cooling than those adjacent cooler areas. In addition, it is desirable to provide a cooling means that conforms to the variant outside diameters of the shrink rings during operation. It is also desirable to provide a cooling means which allows prompt detection of leaks in the stress liner.

SUMMARY OF THE INVENTION

Use of this invention maintains the shrink rings at substantially uniform size and temperature but does not possess the disadvantages of cooling means similar to the unitary jacket discussed above. The cooling means of the present invention can be adapted to deliver a greater cooling effect to those shrink rings adjacent hotter areas to promote uniformity in size and temperature of the rings to eliminate nonuniform stress producing bending stresses.

Another advantage of the present invention is that it can conform to the variant diameters of the shrink rings during operation to ensure maximum thermal conductivity. An additional advantage of the present invention is that it provides a means for cooling the shrink rings that does not cover the entire shrink ring. The boundaries between abutting shrink rings are exposed and any leakage from the pressure vessel can be detected promptly.

The present invention is a cooled pressure vessel comprising a cylindrical stress liner, a pair of end plates, a plurality of annular shrink rings positioned about the circumference of the stress liner, and a plurality of hollow annular cooling jackets, each extending about and tightly abutting the external circumference of the shrink ring and containing a coolant. The present invention also includes a method of evenly distributing stresses in a pressure vessel having annular shrink rings and hollow annular cooling jackets about the shrink rings comprising the steps for detecting a shrink ring having stresses higher than a predetermined value and causing coolant to flow through the cooling jacket about the shrink ring and recirculate through a heat exchanger.

BRIEF DESCRIPTION OF THE DRAWINGS

FIG. 5 is an elevation in section of the present invention.

DESCRIPTION OF THE PREFERRED EMBODIMENT

Figure 1:
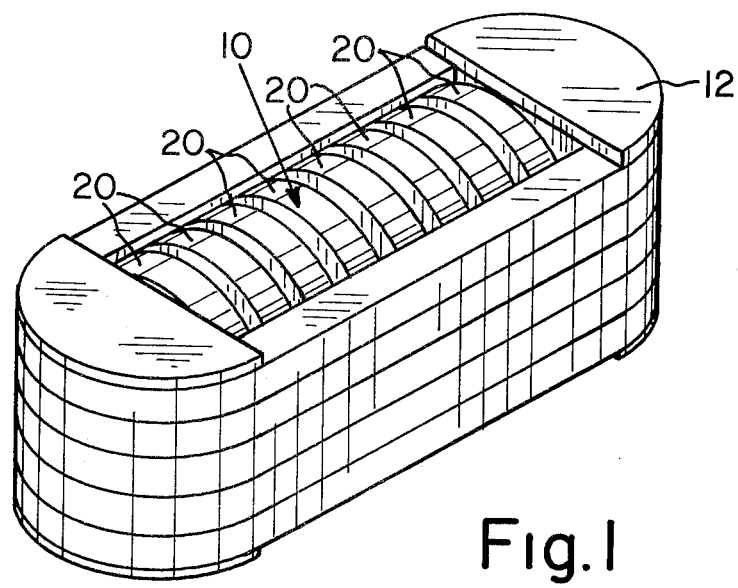
FIG. 1 is a perspective view of the pressure vessel positioned within a reaction frame.

The pressure vessel, generally designated 10, is designed to be placed within a reaction frame 12, FIG. 1. The pressure vessel 10 comprises a cylindrical stress liner 14 having disc-shaped cover plates 16 adjacent each end, FIG. 2. A plurality of annular shrink rings 18 are coaxially positioned in abutting relationship along the length of the stress liner 14. Annular cooling jackets 20 are fitted about the outside surface of each shrink ring 18. Each cooling jacket 20 defines a passage filled with a coolant 22.

The cooling jackets 20 have a rectangular cross-section. This shape is desirable in that it provides a large area of contact between the outer surface of a shrink ring 18 and the inner surface of a jacket 20 which maximizes heat transfer to the coolant 22. Heat transfer is improved if the cooling jacket 20 are thin-walled.

Each jacket 20 is provided with a coolant inlet 24 and a coolant outlet 26 connected to a heat exchanger 6 by hoses 28 and 29. In the preferred embodiment shown in FIG. 2, each cooling jacket 20 is on a separate circuit with the heat exchanger 6. Each inlet 24 is connected directly to the heat exchanger 5 by hose 28. Similarly, each outlet 26 is connected by a hose 29 to the heat exchanger inlet 7. Pumps 8 are located on each inlet hose 28 and are independently operable.

Strain gauges 32 are located on the outer surfaces of the shrink rings 18. The output of the strain gauges 32 is fed into a control 34 which can start an individual pump 8 if a strain gauge 32 registers expansion of a shrink ring 18 beyond a predetermined amount.

Figure 3:
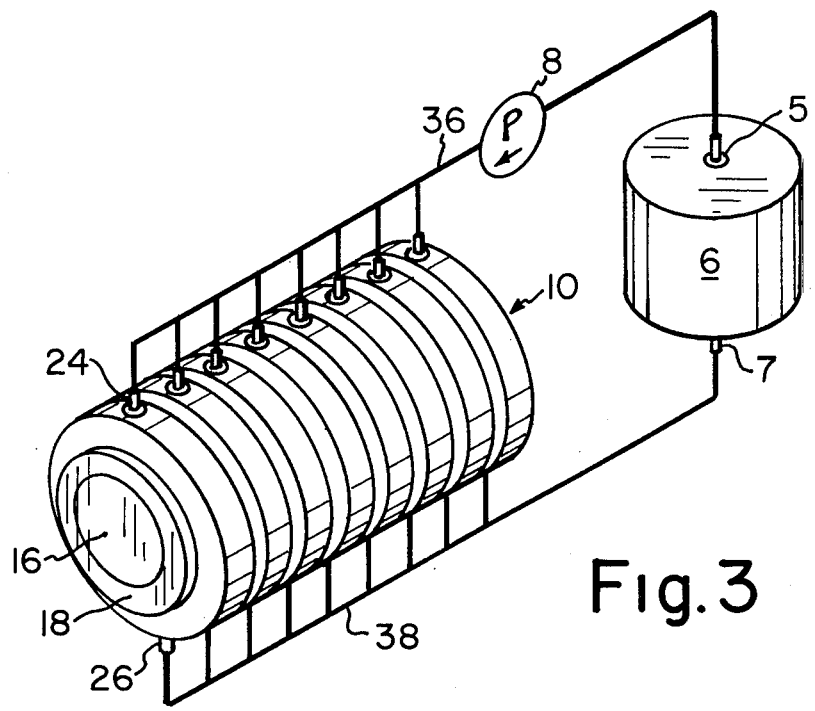
FIG. 3 is a schematic showing the cooling means of the present invention connected in parallel.

Alternatively, the cooling jackets 20 can be connected in parallel relationship to the heat exchanger 6, FIG. 3. All inlets 24 are supplied by a single inlet hose 36 from the heat exchanger outlet 5 and the coolant 22 is circulated through the entire system by a single pump 8. Similarly, all the outlets 26 are connected by a single outlet hose 38 to the heat exchanger inlet 7.

Figure 4:
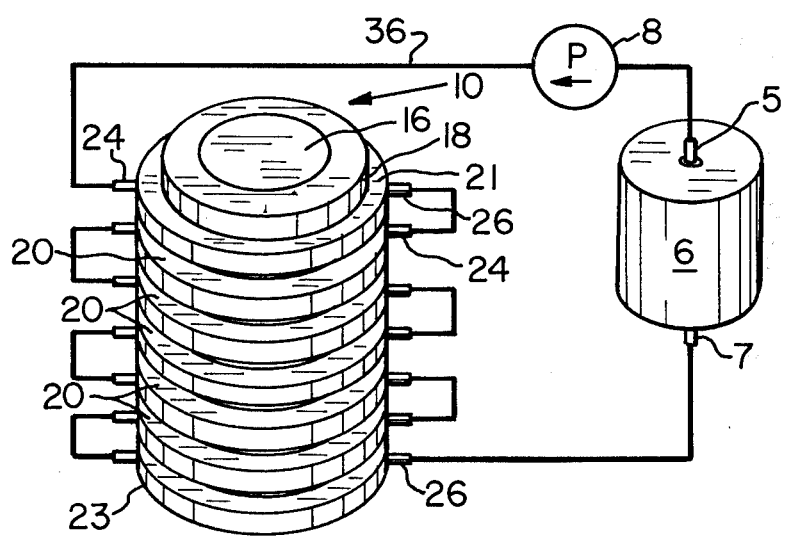
FIG. 4 is a schematic showing the cooling means of the present invention connected in series.

When the pressure vessel 10 houses the furnace and other apparatus for hot isostatic pressing, it is operated in a vertical position; that is, the longitudinal axis of the vessel is normal to the horizontal, FIG. 4. In this mode, it may be desirable to have the cooling jackets 20 connected in series. The inlet 24 of the topmost jacket 21 is connected to the heat exchanger outlet 5 by inlet hose 36 and the outlet 26 of the topmost jacket is connected to the inlet 24 of the next highest jacket 20. This is repeated for all the jackets 20 of the vessel 10 except that the outlet 26 of the lowermost jacket 23 is connected to the heat exchanger inlet 7. A pump 8 located on hose 36 circulates coolant through the system.

Another embodiment of the invention is shown in FIG. 5. An integral cooling jacket 40, in the shape of a U-shaped annular channel whose open side abuts the shrink ring 18, can be used. An O-ring gasket 42 fits within a recess 44 in each leg 45 of the integral cooling jacket 40 to provide a leak-proof seal between the cooling jacket and the adjacent shrink ring 18. The integral cooling jacket 40 is of a diameter such that it can be press fitted about the shrink ring 18.

The stress liner 14, cover plate 16, and shrink rings 18 can be made from high strength steel. The cooling jackets 20 and couplings 30 can be made from a corrosion resistant alloy steel. The hoses 28 can be made from a corrosion resistant flexible material. The O-ring gaskets 42 can be made from a heat resistant flexible material.

As the temperature and/or pressure of the atmosphere within the vessel 10 increases, pressure is exerted against the stress liner 14 and cover plate 16. The forces exerted against the cover plates 16 are transmitted to the reaction frame 12 which holds the cover plates in place. The forces exerted against the stress liner 14 are transmitted to the shrink rings 18 which support the stress liner.

The heat transmitted to the shrink rings 18 from the stress liner 14 causes thermal expansion of the liners allowing further deformation of the stress liner. If the heating of the shrink rings 18 is nonuniform, those rings receiving more heat energy will expand more than those receiving less, resulting in uneven expansion of the shrink rings and stress liner 14 and creating nonuniform stress producing bending stresses in those heated portions of the stress liner. These bending stresses will shorten the fatigue life of the stress liner 14.

Figure 2:
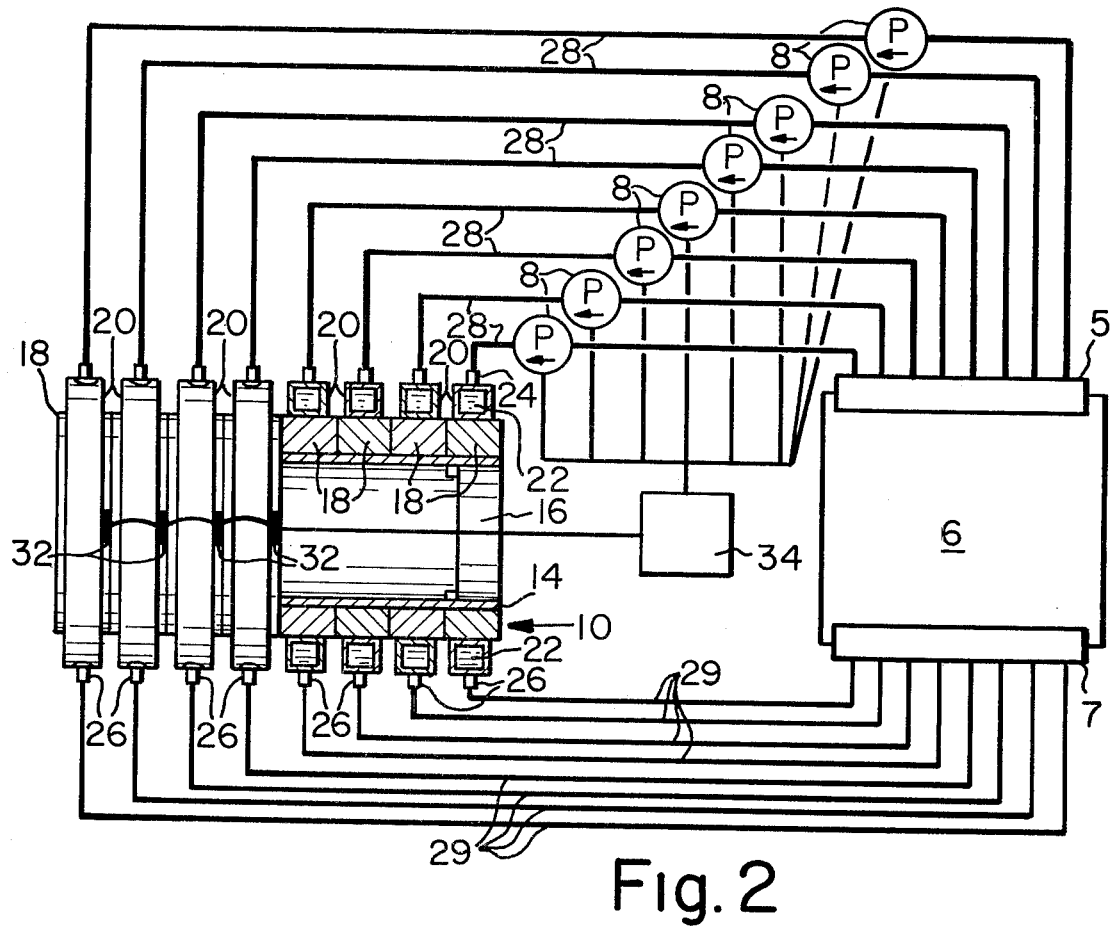
FIG. 2 is an elevation in partial section of a pressure vessel and the cooling means of the present invention.

As shown in FIG. 2, the coolant 22 surrounding each shrink ring 18 absorbs this heat energy as it is circulated through the jacket 20 by the pump 8 and transports it to the heat exchanger 6 by way of the outlet 26 where the coolant is cooled. Coolant 22, now at a lower temperature, reenters a cooling jacket 20 through the inlet 24. This circulation of coolant 22 through the jackets 20 maintains the shrink rings 18 at a lower temperature and reduces expansion of the rings and stress liner 14 due to heating.

Bending stresses in the stress liner 14 and shrink rings 18 due to nonuniform heating of the shrink rings can be reduced by controlling the flow of coolant in each individual jacket. The first step is to detect which shrink rings 18 are under the greatest stress due to thermal expansion. This is accomplished by monitoring each shrink ring 18 with a strain gauge 32 positioned on the ring to detect expansion of the ring in the circumferential direction. The output of each strain gauge 32 is monitored by a control 34 which detects which shrink rings 18 are under the greatest strain.

The next step is to increase the rate of heat removal from that shrink ring. This can be accomplished by increasing the rate at which the coolant 22 is being circulated through the jacket 20 by increasing the flow rate of the pump 8 on the circuit of the ring 18 in question.

Aside from the flexibility the system of the present invention provides in that each shrink ring 18 can be cooled independently of the others, the invention possesses additional advantages over other forms of cooled pressure vessels. For example, the jackets 20 do not cover the interstices between the shrink rings 18. In the case of a leak in the stress liner 14, this feature would allow the leaking material to be readily detected as it flowed between the shrink rings 18. Furthermore, the leaking material would be unable to contaminate the coolant 22 in the cooling coils 20 and thus would eliminate damages to the pump and heat exchanger system.

Another advantage of the present invention is that the jackets 20 can be fitted tightly over the shrink rings 18 and can expand or contract with each individual ring to ensure maximum thermal conductivity at all times during operation.

I claim

1. A pressure vessel comprising:
   A. a cylindrical stress liner;
   B. a pair of end plates each located within the stress liner adjacent an end;
   C. a plurality of annular shrink rings coaxially positioned in abutting relationship about the circumference of the stress liner;
   D. a plurality of distant hollow annular cooling jackets, each extending about and abutting the external circumference of a shrink ring and positioned thereon such that the spaces between the rings are not covered by the jackets;
   E. a heat exchanger communicating with the jackets;
   F. a coolant located in the jackets and heat exchanger; and
   G. a means for urging the coolant through the heat exchanger and the jackets.

2. The vessel of claim 1 wherein each jacket communicates directly with the heat exchanger.

3. The vessel of claim 2 wherein each jacket has an inlet and an outlet, the inlets communicating directly with an outlet of the heat exchanger by means of a first hose, and the outlets communicating directly with an inlet to the heat exchanger by means of a second hose; and wherein the means for urging the coolant comprises a plurality of pumps, each communicating with a first hose.

4. The vessel of claim 3 further comprising a means for detecting strain in a shrink ring and a means for determining whether the strain in a shrink ring is above a predetermined amount which activates a pump located on a first hose communicating with the jacket abutting the shrink ring having strain above a predetermined amount whereby coolant is urged from the heat exchanger through the first hose to the jacket and from the jacket through the second hose back to the heat exchanger.

5. The vessel of claim 4 wherein the means for detecting strain is a strain gauge.

6. The vessel of claim 1 wherein each jacket has an inlet and an outlet, and wherein the inlets are joined by a first hose which communicates with an outlet of the heat exchanger and the outlets are joined by a second hose which communicates with an inlet to the heat exchanger.

7. The vessel of claim 6 wherein the means for urging the coolant comprises a pump located on the first hose.

8. The vessel of claim 1 wherein each jacket has an inlet and an outlet, the inlets and outlets of the jackets connected in series relationship with the heat exchanger.

9. The vessel of claim 8 wherein the means for urging the coolant comprises a pump located between an outlet of the heat exchanger and the inlet of the jacket.

10. The vessel of claim 1 wherein the hollow annular cooling jackets are in the form of U-shaped channels whose open side abuts the external circumference of a shrink ring and are positioned thereon such that the spaces between the rings are not covered by the jackets.

11. A method of evenly distributing stresses in a pressure vessel having annular shrink rings and hollow annular cooling jackets about the shrink rings comprising the steps for:

(a) detecting a shrink ring having stresses higher than a predetermined value, and (b) causing coolant to flow through the cooling jacket about the shrink ring and to recirculate through a reservoir which communicates with the shrink ring.

* * * * *